Patented Sept. 17, 1940

2,214,769

UNITED STATES PATENT OFFICE 2,214,769

SYNTHETIC RESINOUS MATERIAL

David Lipkin, Philadelphia, Pa., assignor to The Atlantic Refining Company, Philadelphia, Pa., a corporation of Pennsylvania No Drawing. Application August 5, 1937,
Serial No. 157,528

4 Claims. (Cl. 260—2)

The present invention relates to the production of synthetic resinous products, and relates more particularly to resinous products obtained by the polymerization of condensation products of phosphonitrilic halides with organic compounds containing at least one reactive group.

A principal object of this invention is the production of useful synthetic resinous products containing phosphorous and nitrogen combined with organic groups. Such products are usually hard, brittle, glassy solids, pale yellow to orange in color, stable to moisture and heat, insoluble in water, and relatively insoluble in fatty oils, mineral oil, gasoline, benzene, ether, and other organic solvents. By varying the nature of the organic groups in the initial condensation products, and by varying the conditions of time and temperature in the polymerization treatment, a variety of resinous products may be obtained, ranging from very viscous liquids to plastics and hard, transparent solids. These resinous products may be suitably employed as ingredients in paints, coatings, rubber, synthetic resins, and insulating compositions, as resins adapted for moulding or shaping into a variety of articles; or as agents which may be suspended or colloidally dispersed in lubricating oils or greases.

My invention consists essentially in first producing an initial condensation product of a phosphonitrilic halide with an organic compound, and then subjecting such condensation product to polymerization by means of heat or other agency capable of producing a polymerizing action. The step of thermal polymerization is preferably effected at a temperature of the order of from about 200° C. to about 400° C. and under sub-atmospheric, atmospheric or superatmospheric pressure. Or, I may carry out the polymerization in the presence of an inert gas such as carbon dioxide, nitrogen or the like. As a result of the polymerization, the initial condensation product is converted into a high molecular weight resinous material.

The synthetic resinous products which may be produced in accordance with my invention are those resulting from the polymerization of the condensation products of the phosphonitrilic halides, and particularly the phosphonitrilic chlorides, with aliphatic, aromatic, hydroaromatic, or heterocyclic alcohols, mercaptans, amines and halogenated hydrocarbons, or other compounds containing functions capable of reaction or condensation with the phosphonitrilic halides.

The phosphonitrilic halides, and particularly the chlorides, which I employ in producing my initial condensation products are shown in the following table:

| Compound | Melting point | Boiling point | |
|---|---|---|---|
| | | 13 m./m. | 760 m./m. |
| | °C. | °C. | |
| (PNCl₂)₃ | 114.0 | 127 | 256.5° C. |
| (PNCl₂)₄ | 123.5 | 188 | 328.5° C. |
| (PNCl₂)₅ | 41.0 | 224 | Polymerizes. |
| (PNCl₂)₆ | 90.0 | 262 | Do. |
| (PNCl₂)₇ | Below −18 | 291 | Do. |
| (PNCl₂)ₓ | Below 500 | Depolymerizes on distillation. | |

Among the organic compounds which I may employ in producing my initial condensation products may be mentioned the hydroxy compounds such as methyl alcohol and its homologues ethyl, propyl, butyl, and amyl alcohols; cresol; xylenols; naphthols; benzyl alcohol; cyclohexanol; furfuryl alcohol; hydroxy pyridine and the like. The mercaptan compounds may be represented by methyl mercaptan and its homologues ethyl, propyl, butyl, and amyl mercaptans; thiophenol; thionaphthols; benzyl mercaptan; pyridyl mercaptans; and cyclohexyl mercaptan. The amino compounds include methylamine and its homologues ethylamine, propylamine, butylamine, amylamine; aniline; toludine; benzylamine; methylaniline; cyclohexylamine; furfurylamine; piperidine, and other substituted ammonias containing at least one reactive hydrogen atom, such as phenylhydrazine. The halogenated hydrocarbons may be represented by methyl chloride and its homologues ethyl, propyl, butyl and amyl chlorides; chloro- or bromobenzene and their homologues; chloro-cyclohexane; and the chloronaphthalenes. Other halogenated compounds which may be suitably employed include the halogenated furanes; halogenated pyridine; halogenated quinoline; and the various halogenated alcohols, phenols, mercaptans, amines and the like.

The condensation reactions for producing the initial condensation products, when employing, for example $(PNCl_2)_3$ and a hydroxy compound, a mercaptan, and an amine, respectively, may be represented by the following equations:

(1) $(PNCl_2)_3 + 6ROH \rightarrow [(RO)_2PN]_3 + 6HCl$
(2) $(PNCl_2)_3 + 6RSH \rightarrow [(RS)_2PN]_3 + 6HCl$
(3) $(PNCl_2)_3 + 6RNH_2 \rightarrow [(RNH)_2PN]_3 + 6HCl$ In the above reaction "R" may be either an aliphatic, hydroaromatic, aromatic, or heterocyclic radical. Furthermore, the reactions may be carried on in the presence or absence of catalysts, and it is not always necessary to employ sufficient of the hydroxy, mercaptan, amino or halogenated hydrocarbon compound to react completely with the phosphonitrilic halide, since in some instances it may be desirable to retain a certain amount of the halogen in the condensation product. Among the catalysts which may be employed may be mentioned copper oxide, copper sulfate, magnesium oxide and magnesium chloride.

In accordance with my invention, two general methods of preparing the initial condensation products may be employed. The first is the relatively low temperature, for example, less than 150° C. and preferably about 100° C., reaction of the phosphonitrilic halide with a metallic salt of the organic compound which it is desired to condense therewith. This reaction is preferably carried out in the presence of an inert solvent or suspension medium. The second method involves the heating of the phosphonitrilic halide with the desired organic compound in a vessel provided with a reflux condenser. The latter method is particularly applicable to the condensation of the phosphonitrilic halide with phenols or thiophenols, since it is characteristic of them that the side reactions which may occur with the alcohols or mercaptans do not take place to an appreciable extent. Thus, higher temperatures may be employed which permit a faster reaction rate. In the case of the alcohols and aliphatic mercaptans, it is desirable to operate at a lower temperature, and, in order to increase the rate of reaction, the alcohol or mercaptan is first caused to combine with a metal, for example, sodium or potassium, to produce an alcoholate or mercaptide which is considerably more reactive than the alcohol or mercaptan from which it is derived. In either of the aforementioned procedures, it may be desirable to carry out the condensation reaction under superatmospheric pressure, for example, of the order of 100 lbs./sq. in., or greater, in order to accelerate the rate of reaction. The condensation of mercaptans or thiophenols with the phosphonitrilic halide is preferably effected in an inert atmosphere to prevent excessive oxidation of the reactants. Methane, nitrogen, or other inert gas may be employed for this purpose.

The initial condensation product of the phosphonitrilic halide with an organic compound, which may be produced as above described, is subjected to a polymerizing action, such as heating to temperatures of the order of from about 200° C. to about 400° C., whereby the initial condensation product is converted to a polymerized resinous product. Temperatures lower than about 200° C. may be employed provided the duration of the heating step is sufficient to effect the desired polymerization. The polymerization may also be effected by subjecting the initial condensation product to the action of ultrasonic waves, or light of suitable wave length, or to the action of catalytic agents such as $AlCl_3$, $ZnCl_2$, $BF_3$ and the like.

A typical example of my product and method of preparing the same is as follows:

5.8 parts by weight of phosphonitrilic chloride, comprising substantially $(PNCl_2)_3$ and $(PNCl_2)_4$, was dissolved in anhydrous benzene. To this solution was added 16.4 parts by weight of n-butylamine and the mixture was refluxed at about 80° C. for about 5 hours. After refluxing was completed, the reaction product was filtered and the filtrate was distilled under reduced pressure to remove the benzene. The distillation residue, consisting principally of N,N'-dibutylmetaphosphimamide $[(C_4H_9NH)_2PN]_n$, was a syrupy, viscous liquid which was soluble in mineral oil, gasoline, benzene and ether. This condensation product so obtained was then subjected to polymerization by heating to about 350° C., under an absolute pressure of about 0.1 mm., for a period of about one hour. As a result of this thermal polymerization, the initial condensation product was converted into a pale-yellow, hard, brittle, glassy solid which was stable to heat, insoluble in water and organic solvents, and resistant to the action of acids and alkalis.

It will be seen from the above example, that there may be produced a resinous material by condensing a phosphonitrilic halide with an organic compound containing at least one reactive group, for example, an amino compound, followed by the polymerization of the condensation product. In lieu of the amino compound there may be employed alcohols, phenols, mercaptans and the like. Any organic compound containing an active group or replaceable hydrogen atom may be employed in my condensation reaction.

In the formula for the condensation product of the above example, subscript "$n$" usually ranges from 3 to 7, depending upon the phosphonitrilic halide employed and the temperature required to effect the initial condensation. When the phosphonitrilic halide comprises essentially $(PNCl_2)_3$ or $(PNCl_2)_4$, and the reaction temperatures are relatively low, the subscript "$n$" of the resulting condensation product will, in general, have a value of 3 or 4. However, when higher reaction temperatures are required, the subscript "$n$" may have a value up to 7 and even higher. While I have described my invention primarily with respect to the use of the phosphonitrilic chlorides as one component in my condensation reaction, I may employ in lieu thereof, the phosphonitrilic bromides, iodides and fluorides.

What I claim is:

1. In a process of producing a light-colored, solid, synthetic resinous material substantially insoluble in organic solvents from a condensation product of a phosphonitrilic chloride with butylamine, the step which comprises heating said condensation product to a temperature within the range of from about 200° C. to about 400° C., under substantially reduced pressure, to effect polymerization thereof.

2. In a process for producing a light colored, solid synthetic resinous material substantially insoluble in organic solvents from a condensation product of a phosphonitrilic chloride with a lower aliphatic amine containing at least one hydrogen atom bonded to the nitrogen atom, the step which comprises heating said condensation product to a temperature within the range of from about 200° C. to about 400° C. under substantially reduced pressure to effect polymerization thereof.

3. A light colored, solid synthetic resin substantially insoluble in organic solvents, comprising a polymerized condensation product of a phosphonitrilic chloride with a lower aliphatic amine containing at least one hydrogen atom bonded to the nitrogen atom.

4. A light colored, solid synthetic resin substantially insoluble in organic solvents, comprising a polymerized condensation product of a phosphonitrilic chloride with n-butylamine.

DAVID LIPKIN.